US012680950B2

(12) United States Patent
Coates et al.

(10) Patent No.: US 12,680,950 B2
(45) Date of Patent: Jul. 14, 2026

(54) FTIR-BASED SENSOR SYSTEM FOR MONITORING GAS, VAPOR, OR FLUID EMISSIONS

(71) Applicant: Lightsense Technology, Inc., Tucson, AZ (US)

(72) Inventors: John Coates, Yarmouth Port, MA (US); Wade Poteet, Vail, AZ (US); Terje Skotheim, Tucson, AZ (US)

(73) Assignee: Lightsense Technology, Inc., Tucson, AZ (US)

( * ) Notice: Subject to any disclaimer, the term of this patent is extended or adjusted under 35 U.S.C. 154(b) by 150 days.

(21) Appl. No.: 18/441,815

(22) Filed: Feb. 14, 2024

(65) Prior Publication Data

US 2024/0280479 A1    Aug. 22, 2024

Related U.S. Application Data

(60) Provisional application No. 63/487,493, filed on Feb. 28, 2023, provisional application No. 63/446,772, filed on Feb. 17, 2023.

(51) Int. Cl.
*G01N 21/3504* (2014.01)
*G01N 21/01* (2006.01)
*G01N 21/35* (2014.01)

(52) U.S. Cl.
CPC . *G01N 21/3504* (2013.01); *G01N 2021/0106* (2013.01); *G01N 2021/3595* (2013.01);
(Continued)

(58) Field of Classification Search
CPC ....... G01N 21/3504; G01N 2021/0106; G01N 2021/3595; G01N 2201/0696; G01N 2201/1056; G01N 21/031
See application file for complete search history.

(56) References Cited

U.S. PATENT DOCUMENTS 5,982,486 A * 11/1999 Wang ...................... G01J 3/453
356/451
6,229,614 B1    5/2001 Larsen
(Continued)

FOREIGN PATENT DOCUMENTS

CA         2912771 C  *  5/2018   ......... G01N 33/0027

OTHER PUBLICATIONS

Non-Final Office Action for U.S. Appl. No 16/738,148, mailing date Jan. 21, 2021, 11 pages, USPTO.
(Continued)

*Primary Examiner* — Kiho Kim
(74) *Attorney, Agent, or Firm* — Jaffery Watson Hamilton & DeSanctis LLP

(57) ABSTRACT

An optical spectral sensing system that provides a full-range mid-IR FTIR based measurement for gases and vapors. The system features a small interferometer module which is integrated with a sample cell and solid-state source, that has an optimized optical path matched to the intended concentration ranges for the gas/vapor measurements. The concentration ranges targeted are from % level for high targeted gas concentrations, as provided by short-pathlength gas cells, to parts-per-million (ppm) and for certain gases high parts-per-billion (ppb) for low trace targeted gas concentrations, provided by long-pathlength gas cells. The optics and optomechanical components selected are able to provide a spectral range of 400 cm$^{-1}$ to 5000 cm$^{-1}$, with nominal spectral resolutions of 4 cm$^{-1}$ to 16 cm$^{-1}$, with the potential to extend the resolution from 2 cm$^{-1}$ out to 32 cm$^{-1}$. The electronics are optimized to support both the range and spectral resolution based the use of a "universal" mid-IR detector.

20 Claims, 10 Drawing Sheets

(52) U.S. Cl.
CPC ................ *G01N 2201/0696* (2013.01); *G01N*
*2201/1056* (2013.01)

(56) References Cited

U.S. PATENT DOCUMENTS

| 8,344,323 | B1 | 1/2013 | Hartley |
| 11,131,624 | B2 | 9/2021 | Poteet |
| 2016/0146722 | A1 | 5/2016 | Koerner |
| 2020/0141866 | A1 | 5/2020 | Gerwert |
| 2020/0217788 | A1 | 7/2020 | Poteet |

OTHER PUBLICATIONS

Notice of Allowance for U.S. Appl. No 16/738,148, mailing date Jun. 1, 2021, 11 pages, USPTO.

ASPECTUS GmbH, "Mid-Infrared Spectroscopy," 2021, 2 pages, Retrieved from the Internet on Apr. 21, 2021 at URL: aspectus-gmbh.com/mid-infrared-spectroscopy.html#:~:text=The%20IR%20Sphinx%20products%20are,or%20of%205.5-11.0%20um.

AZO Materials, "FluidScan Q1200: Portable Marine Base Number Analyzer," 2021, 5 pages, Retrieved from the Internet on Apr. 21, 2021 at URL: azom.com/equipment-details.aspx?EquipID=4231.

G. Lawson et al., "Counterfeit Tablet Investigations: Can ATR FT/IR Provide Rapid Targeted Quantitative Analyses?," Journal of Analytical & Bioanalytical Techniques, 2014, 6 pages, vol. 5, Issue 5.

H. Schumacher et al., "Applications of Microstructured Silicon Wafers as Internal Reflection Elements in Attenuated Total Reflection Fourier Transform Infrared Spectroscopy," Applied Spectroscopy, 2010, pp. 1022-1027, vol. 64, No. 9.

S. De Bruyne et al., "Applications of Mid-Infrared Spectroscopy in the Clinical Laboratory Setting," Critical Reviews in Clinical Laboratory Sciences, 2018, 21 pages, vol. 55, No. 1, Taylor & Francis.

SelectScience, "The Ocean MZ5 Miniature Spectrometer for MIR Analysis," Jan. 3, 2019, 3 pages, Retrieved from the Internet on Apr. 21, 2021 at URL: selectscience.net/SelectScience-TV/Videos/the-ocean-mz5-miniaturespectrometer-for-mir-analysis/?videoID=4472.

Thermo Fisher Scientific, "Portable Analysis for Material ID," 2021, 3 pages, Retrieved from the Internet on Apr. 21, 2021 at URL: thermofisher.com/us/en/home/industrial/spectroscopy-elemental-isotope-analysis/portableanalysis-material-id.html.

\* cited by examiner

*100*

*110*

*115*

*120*
Beam Splitter

Detector

*130*
Mirror

*140*

740

Detector

702 Gas Cell

Source ~710

910
Gas Cell And
Source

980 FTIR

1080 FTIR

1010
Gas Cell
And Source

View Shown With Outer Top
Cover Removed For Clarity

FTIR-BASED SENSOR SYSTEM FOR MONITORING GAS, VAPOR, OR FLUID EMISSIONS

CROSS-REFERENCE TO RELATED FILED/PUBLISHED PATENTS

This application is related to United States Patent U.S. Pat. No. 11,131,624 B2 entitled "COMPACT FOURIER TRANSFORM INFRARED SPECTROMETER" filed Jan. 9, 2020, the subject matter thereof is incorporated by reference in its entirety.

This application claims priority to U.S. Provisional Patent Application No. 63/446,772, filed Feb. 17, 2023 by John Coates, et al., which is entitled "An FTIR-based Sensory System for Monitoring Gas, Vapor, or Fluid Emissions," and U.S. Provisional Patent Application No. 63/487,493, filed Feb. 28, 2023 by John Coates, et al., which is entitled "An FTIR-based Sensory System for Monitoring Gas, Vapor, or Fluid Emissions," which both are incorporated by reference herein.

FIELD OF THE INVENTION

The present disclosure relates to optical sensors and associated systems that feature an fourier transform infrared (FTIR) measurement system. More particularly, it relates to FTIR sensors applied to gas, vapor, and fluid monitoring.

BACKGROUND

The role of infrared-based optical spectral measurements for the monitoring of static and dynamic gas and vapor systems is well established in the field of spectroscopy. Traditional systems may include the use of a spectrometric measurement system, such as a spectrometer or photometer (filter-based), optically interfaced to a flowing gas, vapor, or fluid stream.

SUMMARY

According to one embodiment of the present disclosure, an optical spectral sensing device for the determination of low concentrations of certain residual process gases emitted from an abatement system applied to the output of a process tool used in semiconductor fabrication is provided. The optical spectral sensing device includes a spectroscopic measurement system based on a small FTIR interfaced to a gas cell. A solid-state emitter source is arranged at the front end of the gas measurement cavity or cell body, and a solid-state detector is arranged at the back end of the optical output of the FTIR component. An electronics package is connected to the FTIR device for the measurement and processing of the electronic signals from the solid-state detector.

BRIEF DESCRIPTION OF THE FIGURES/DRAWINGS

DETAILED DESCRIPTION

It is to be understood that the figures and descriptions of the present invention have been simplified to illustrate elements that are relevant for a clear understanding of the present invention, while eliminating, for purposes of clarity, many other elements found in gas/vapor measuring systems, including those utilizing spectroscopy. However, because such elements are well known in the Art, and because they do not facilitate a better understanding of the present invention, a discussion of such elements is not provided herein.

In order to provide an indication of scale for the different gas cells that are referenced, simple descriptive terms have been used, such as ultra-short, short, long, and extended long pathlengths. As a general estimate of size these may be "quantified" by being defined as follows:

i. Ultra-short: 0.05 mm to 0.5 mm
ii. Short: 2 mm to 100 mm
iii. Long: 0.5 m to 2 m
iv. Extended-long: 1 m to 10 m The disclosure herein is directed to all such variations and modifications known to those skilled in the Art.

Figure 1:
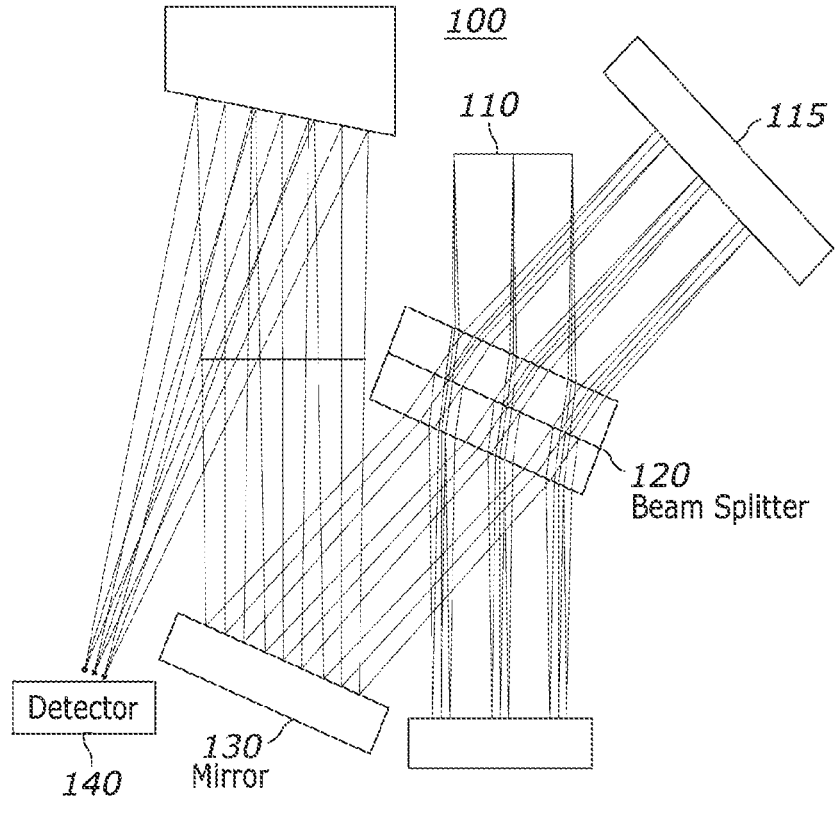
FIG. 1 illustrates an Interferometer with Moving Beam Splitter Assembly in accordance with one embodiment.
Figure 2:
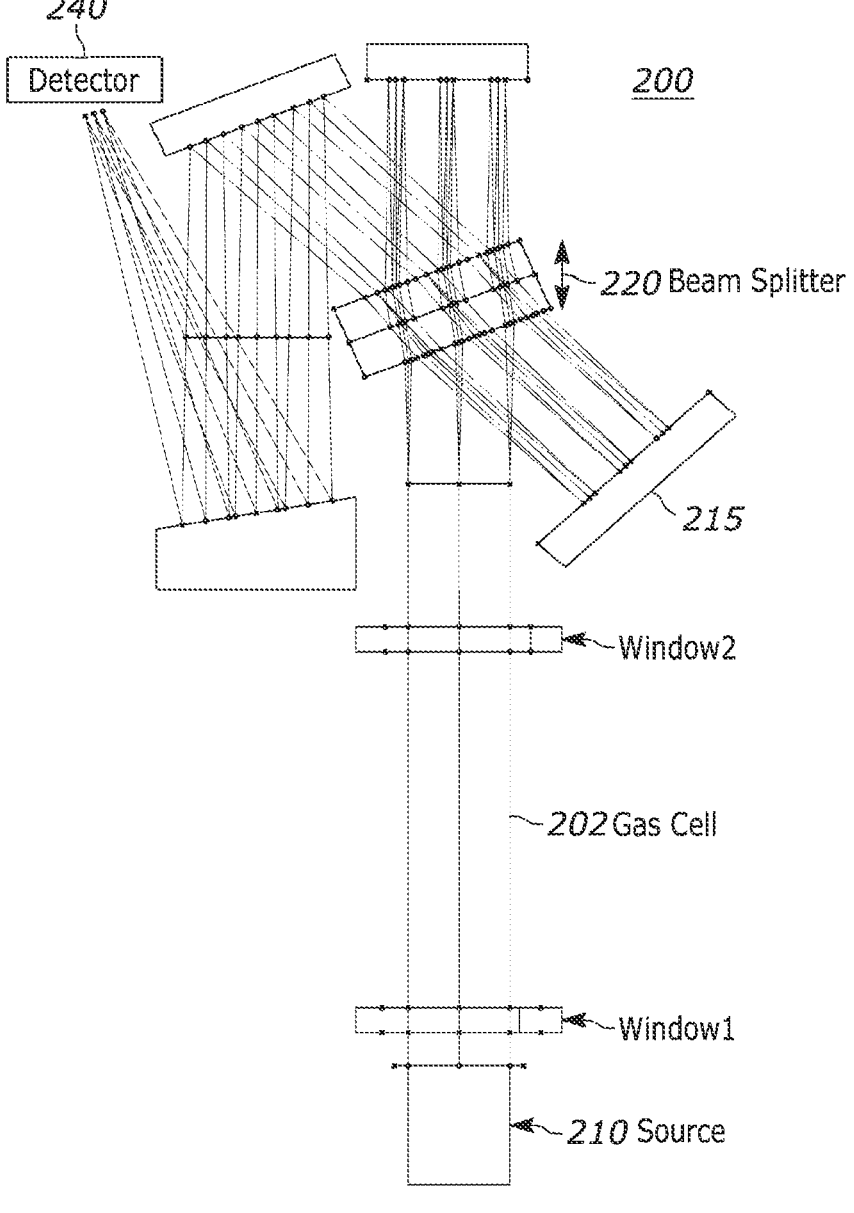
FIG. 2 illustrates an integrated assembly with Source/Gas Cell and Interferometer in accordance with one embodiment.

In the following detailed description, reference is made to the accompanying drawings that show, by way of illustration, different embodiments in which the invention may be practiced and that utilize the scale definitions outlined above. The different scales used enable a wide range of gas, vapor, or fluid compositions to be handled from part per billion (ppb) levels to high percentage Levels with the same FTIR sensing device. Part per billion is a number of units of mass of a contaminant per 1000 million units of total mass. It is to be understood that the location or arrangement of individual elements within each disclosed embodiment may be modified without departing from the scope of embodiments of the invention. For example, one embodiment of FIGS. 1 and 2 is based on a light source (e.g., source 110, source 210, high output compact infrared (IR) light source, micro-electro-mechanical system (MEMS) light source) directly interfaced to the gas, vapor, or fluid measurement cell, and the output of said cell is interfaced to the FTIR sensor. The optical output from the FTIR sensor is imaged on to a detector sensing element (e.g., detector 140, detector 240). The optical train of this current embodiment is throughput optimized, where the source image is maintained through the measurement cell by the use of optics, if required, and is reimaged at the optical input of the FTIR. The output of the FTIR is in turn imaged on the sensing element of an infrared detector. For illustration purposes an example system (e.g., FTIR sensor system 100, FTIR sensor system 200) features a IR source (e.g., 110, 210) with a 0.5 inch (13 mm) parabolic reflector, the gas cell (e.g., gas cell 202 with 50 mm pathlength) either has a simple straight-through geometry, maintained at 0.5 inch (13 mm) or a multiple reflection cavity with an extended pathlength, that features shaped optics to maintain the geometry of the IR source, and the miniature FTIR module (e.g., 115, 215) has a beam-splitter geometry (e.g., ½ inch diameter) to match the source geometry, thereby maintaining an optimized optical throughput. In one example, the 50 mm pathlength gas cell has a width of approximately 1.65 inches (42 mm), a height of 1.26 inches (32 mm), and a length of 3.76 inches (96 mm). The FTIR module 115, 215 has a width of 3.82 inches (97 mm), a height of 1.54 inches (39 mm), and a length of 7.56 inches (192 mm).

Figure 3:
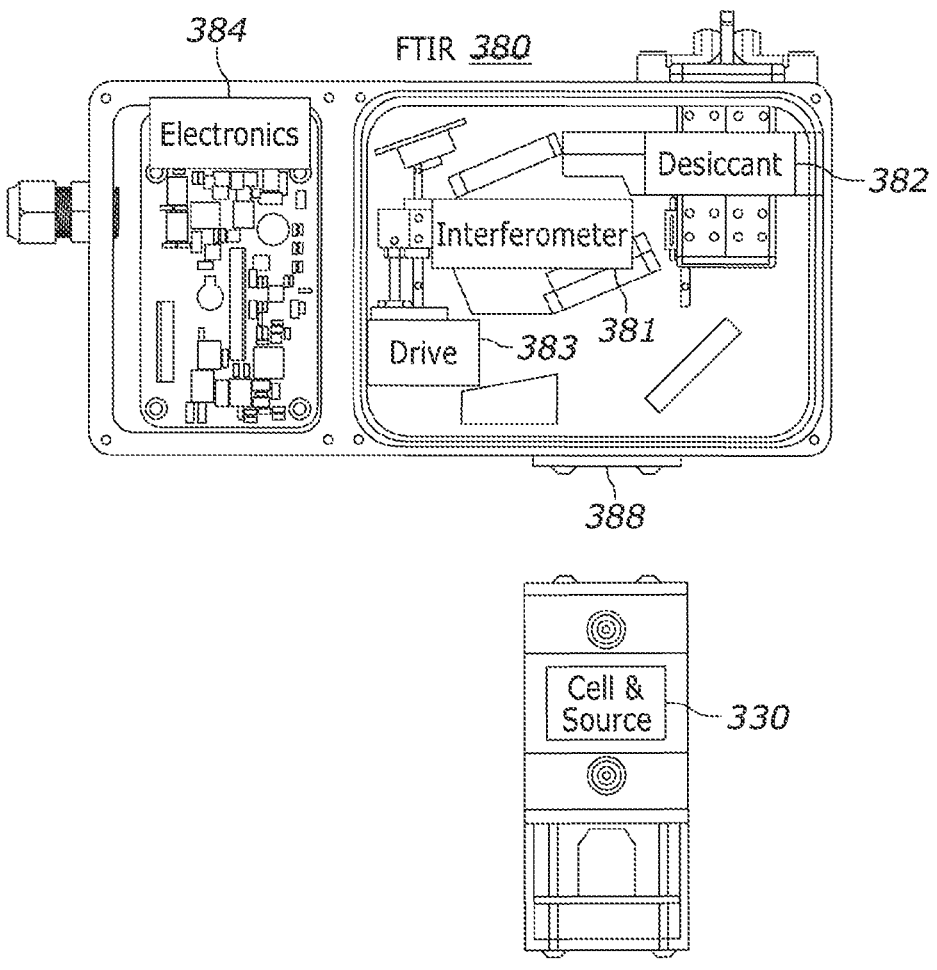
FIG. 3 illustrates a Top View of a Packaged FTIR with Cell and Source (Short Path) in accordance with one embodiment.
Figure 4:
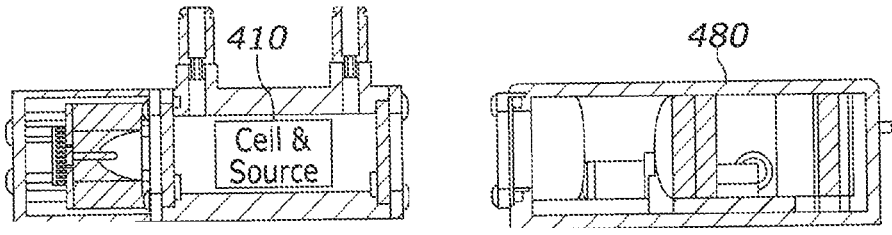
FIG. 4 illustrates a Side View of a Packaged FTIR with Cell and Source (Short Path) in accordance with one embodiment.

When size is an important consideration, this may be adjusted based on the diameter of the source reflector. For the current embodiment, this can be set at 0.5 inch (13 mm). If optical throughput requires adjustment to match the diameter of the source this can be set larger (e.g., ¾ inch) or smaller (e.g., ⅜ inch), and optimization can be maintained by scaling all other optics accordingly. For simple transmission gas cells (e.g., 202, 310, 410), the diameter of the gas cell can be optimized to the source output diameter as illustrated in FIGS. 2, 3, and 4. The gas cell 202 is shown with window 1 and window 2 in FIG. 2.

Figure 11:
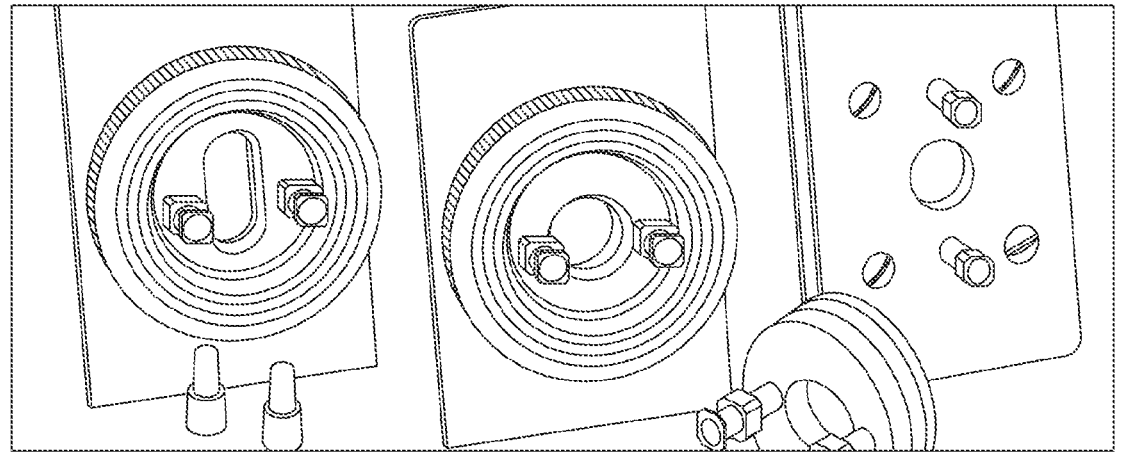
FIG. 11 illustrates an Example of Ultra-Short Pathlength Gas Cells (0.05 mm-0.5 mm) in accordance with some embodiments.

FIG. 3 illustrates a Top View of a Packaged FTIR module 380 with Cell and Source (Short Path) 310 in accordance with one embodiment. The FTIR Module 380 includes an interferometer bench 381, a desiccant 382, a drive 383, and electronics 384. FIG. 4 illustrates a side view of gas cell and source 410 and packaged FTIR module 480. Note that for single-pass cells it is possible to use commercially available cells if there are no specific material requirements. In the case of ultra-short path cells, a simple liquid cell may also be used for high concentration measurements. Examples of such gas cells (e.g., 0.05 mm-0.5 mm) are provided in FIG. 11 in accordance with some embodiments. A gas cell can be a disposable that is replaced periodically or when contaminated.

Figure 5:
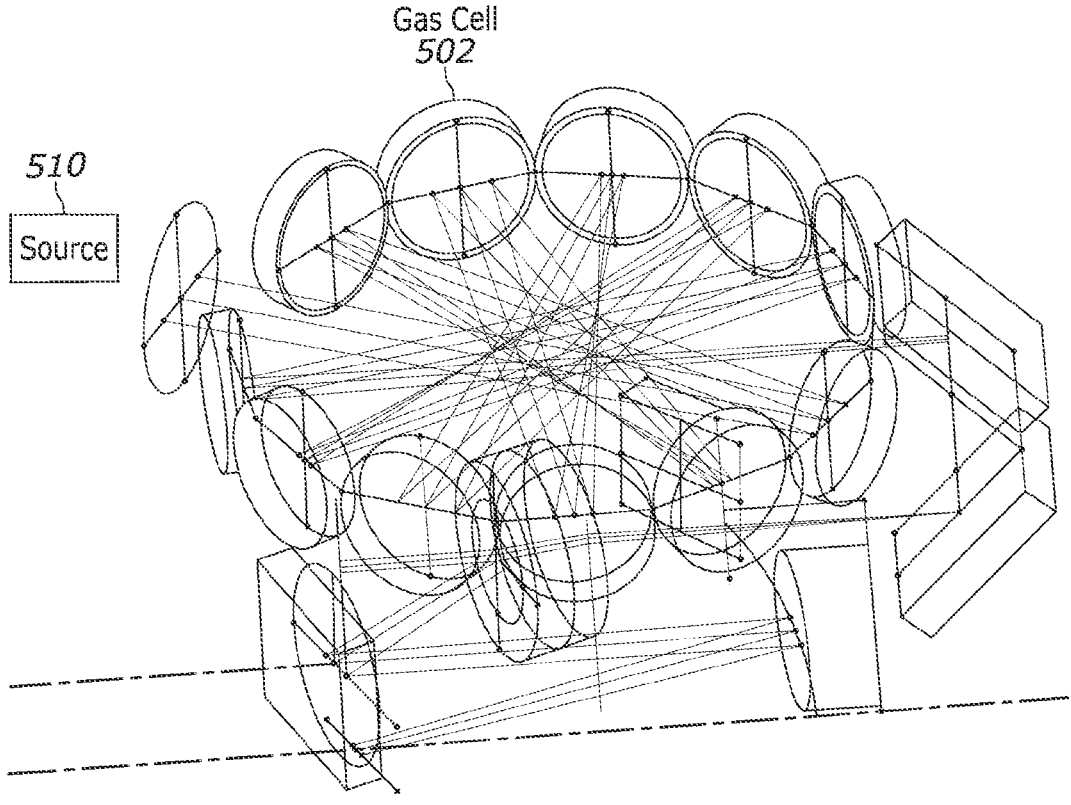
FIG. 5 illustrates a Plan View of a FTIR module with Cell and Source (Long Path) in accordance with another embodiment.
Figure 6:
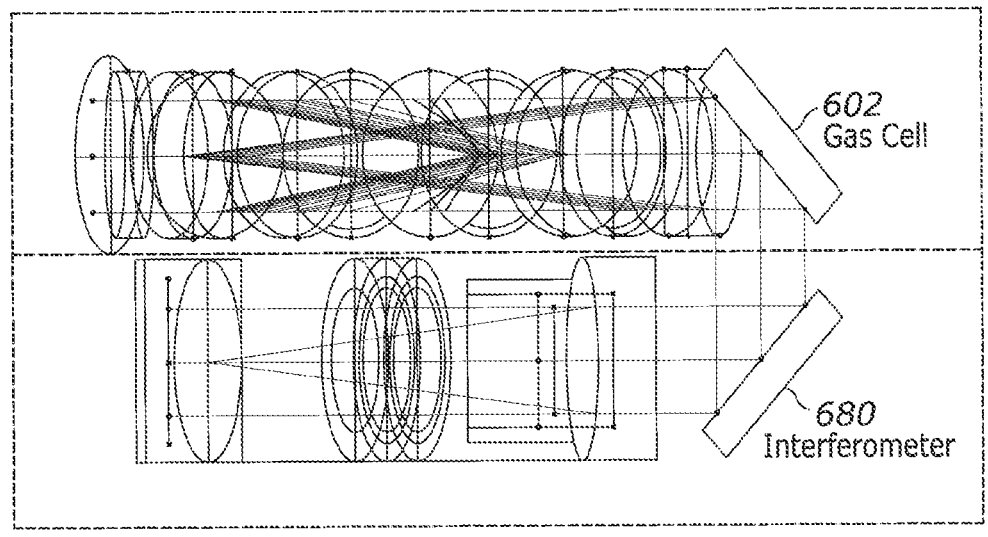
FIG. 6 illustrates a Side View of a FTIR module with Cell and Source (Long Path) in accordance with another embodiment.
Figure 7:
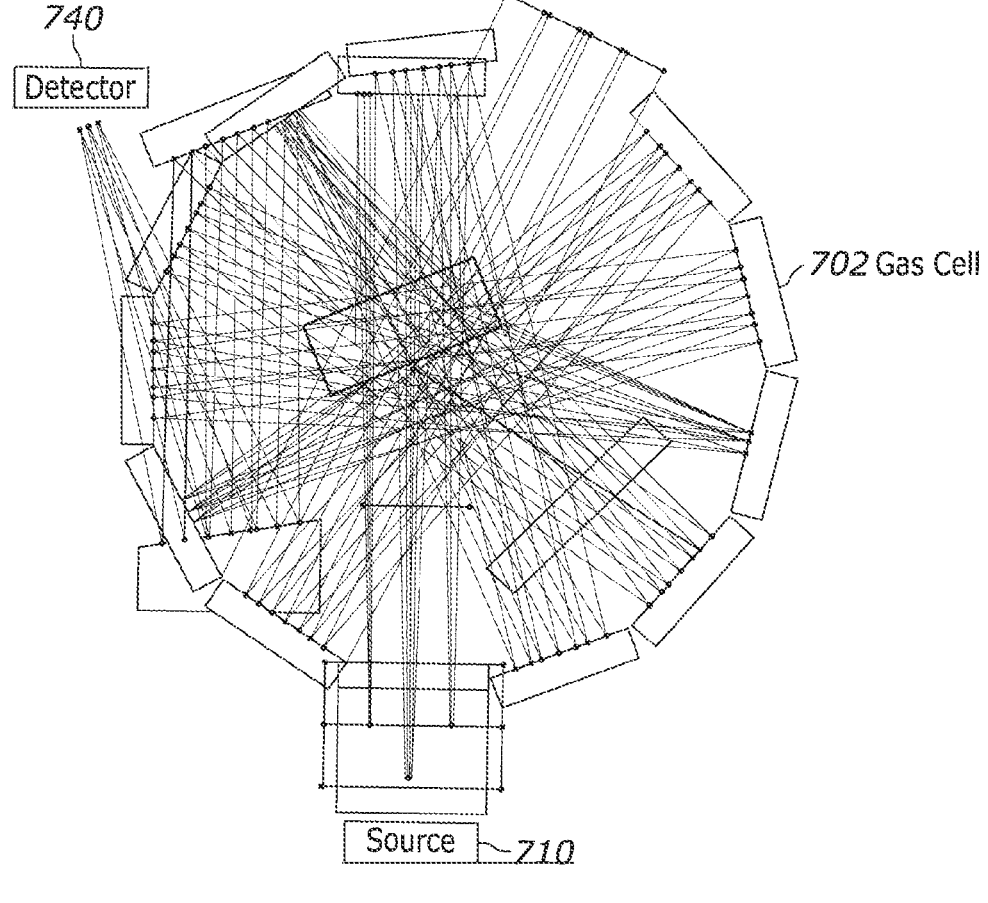
FIG. 7 illustrates a Top View of a FTIR module with Cell and Source (Long Path) in accordance with another embodiment.
Figure 9:
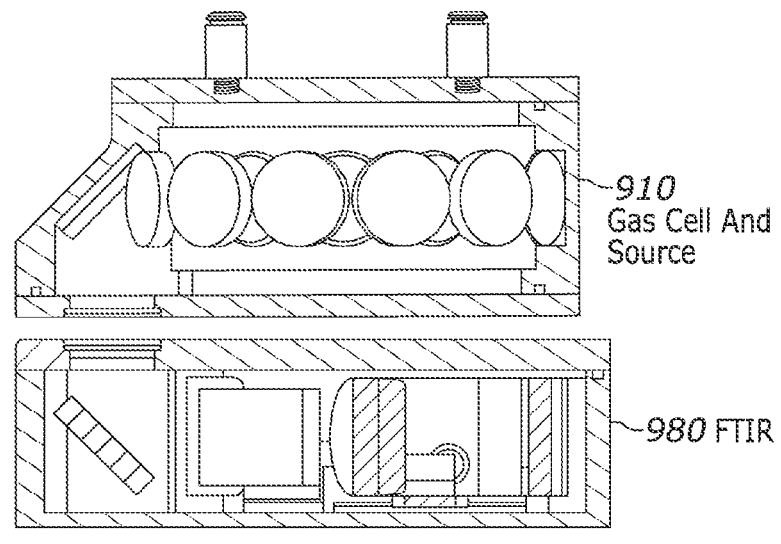
FIG. 9 illustrates a Side View of a Packaged FTIR with Cell and Source (Long Path) in accordance with another embodiment.

In the case of an extended pathlength cell, the optical path is extended by the use of multiple reflections between mirror pairs where each reflection from a mirror is reimaged upon the next mirror. This imaging process is maintained for the complete optical path of the cell. In order to optimize this process, the mirror surfaces are usually shaped to ensure optimum coupling between the mirror pairs. Two different approaches to this imaging are featured for the examples provided here; a circular geometry where the IR beam from IR source (e.g., source 510, source 710, gas cell and source 1010) enters a cylindrical construction with opposing mirrors and the beam finally exits the construction after multiple reimaging throughout the cell cavity (e.g., FIGS. 5, 6, 7 9, and 10) of a gas cell (e.g., gas cell 502, gas cell 602, gas cell 702, gas cell and source 910, ga). FIG. 5 illustrates a Plan View of a FTIR module with Cell and Source (Long Path) in accordance with another embodiment. FIG. 6 illustrates a Side View of a FTIR module with gas Cell 602, interferometer 680, and Source (Long Path) in accordance with another embodiment. FIG. 7 illustrates a Top View of a FTIR module with Cell and Source (Long Path) in accordance with another embodiment. FIG. 9 illustrates a Side View of a Packaged FTIR with Cell and Source (Long Path) in accordance with another embodiment.

Figure 10:
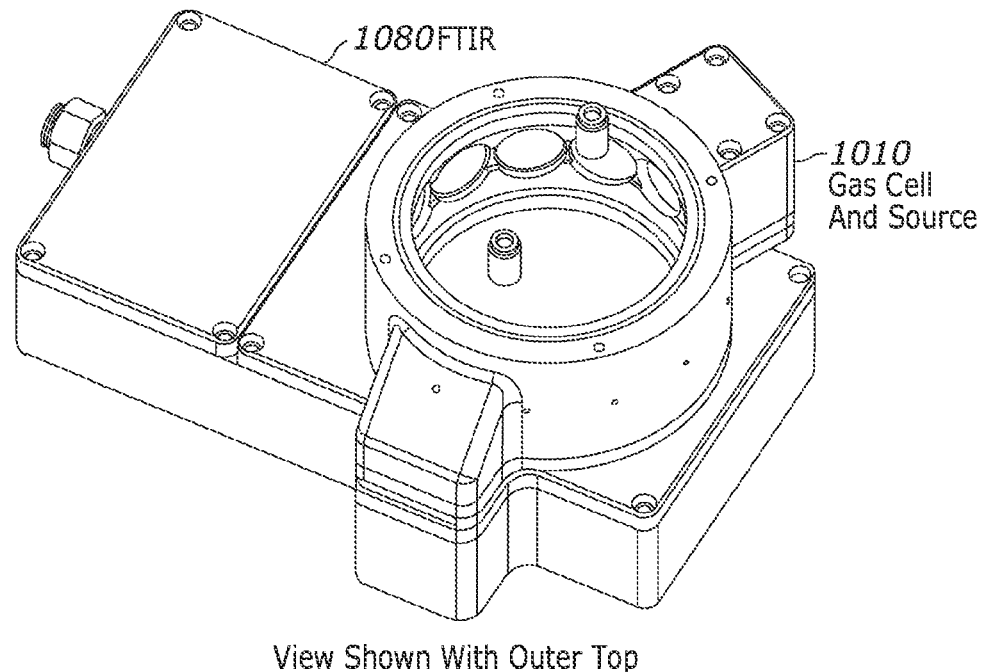
FIG. 10 illustrates a Plan View of a Fully Assembled Long Path FTIR Sensor System in accordance with another embodiment.

FIG. 10 illustrates a Plan View of a Fully Assembled Long Path FTIR Sensor System having gas cell and source 1010 and FTIR module 1080 in accordance with another embodiment. This example features 14 reflections and yields an optical pathlength of 1 meter. In one example, the 1 meter pathlength gas cell has a width of approximately 3.86 inches (98 mm), a height of 1.97 inches (50 mm), and a length of 5.54 inches (141 mm). The FTIR module has a width of 3.86 inches (98 mm), a height of 1.54 inches (39 mm), and a length of 7.56 inches (192 mm).

Figure 8A:
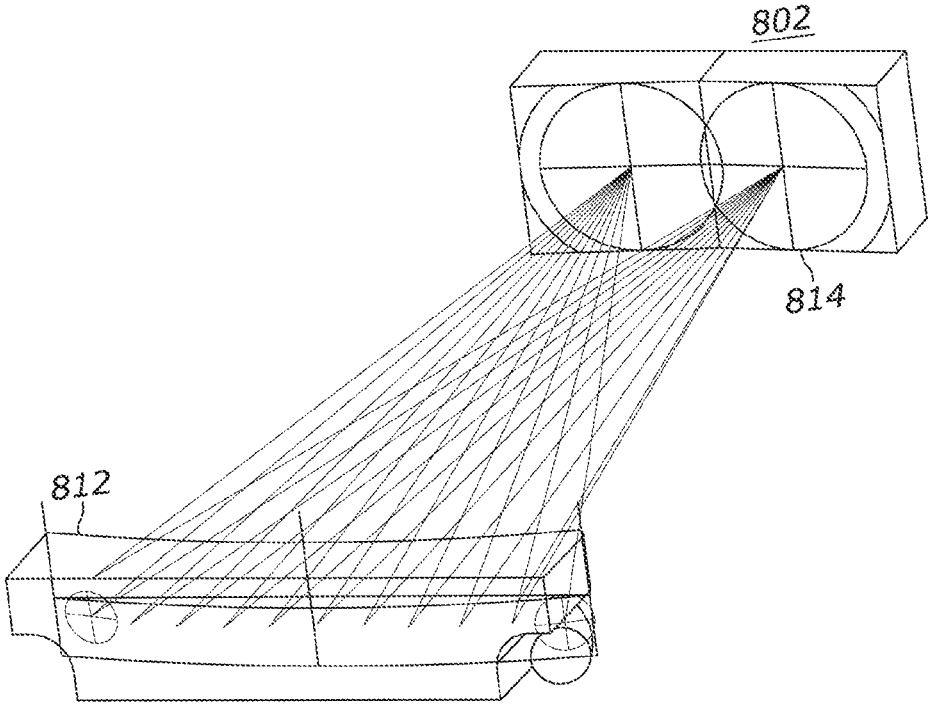
FIGS. 8A and 8B illustrate Alternative Optics for Long Path Cell Design (White Cell) in accordance with an alternative embodiment.
Figure 8B:
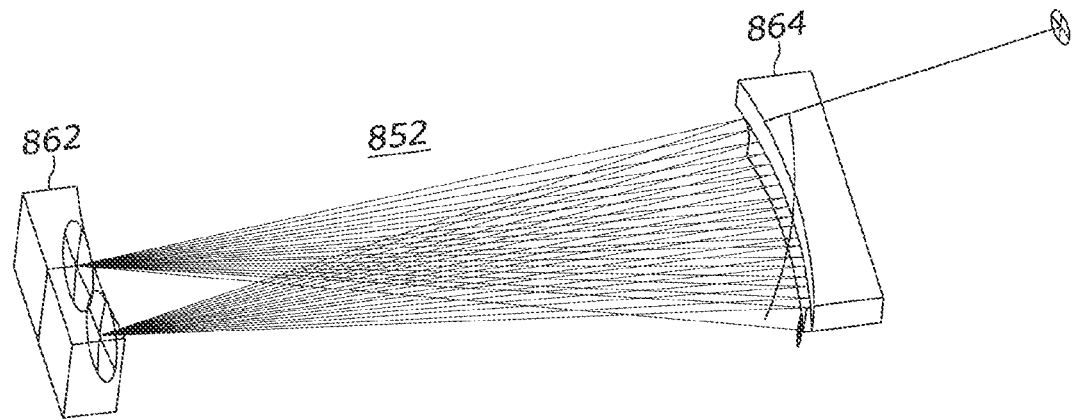

The second approach to maintaining multiple reflections through the sample cavity is provided by the White Cell approach of FIGS. 8A and 8B. In one example, multiple reflections traverse the sample cavity 802 between a shaped mirror surface 812 and a pair of opposing flat mirror surfaces 814 as illustrated in FIG. 8A. Alternatively, the flat mirror surfaces 814 can be replaced with a shaped mirror surface in which reimaging occurs upon each other. Cavity 852 of FIG. 8B illustrates a shaped mirror surface 864 and a pair of opposing flat mirror surfaces 862. For the example provided in FIGS. 8A and 8B, the geometry provides 40 reflections between the opposing mirror surfaces and yields an extended optical pathlength of 5 meters. Both cell concepts provide the required image quality to ensure efficient traversing of IR beam through the gas cell cavity.

Returning to the IR source (e.g., source 510, source 710), in the example provided the electrically heated source is assembled with a focusing optic, a cylindrical parabolic mirror. The heated element can be a wire coil, a ceramic element or a heater element, such as the Norton gas igniter source that is commonly used in FTIR instrumentation. Consistent with the geometry proposed, a ½ inch (13 mm) source assembly would be an appropriate configuration. Alternative geometries can be ⅜ inch, ¾ inch, and 1 inch reflector assemblies. Switching to one of these alternatives would require changes to the size of the supporting optics to ensure optimum performance.

The unique feature of the FTIR module of the present disclosure is the use of a moving beam-splitter assembly as the scanning element. In this version of the optical assembly, the beamsplitters and the fixed mirror are mounted on a common plate (e.g., in FIG. 1, Beam splitter 120 and Mirror 130 are mounted on a common plate) and only these two components move together within the scan cycle to prevent motion on the detector 140. All other optical components remain fixed in position, for example, FIG. 1, includes Source 110 and detector 140. Note that the beam-splitter would normally be constructed from potassium bromide (KBr) or zinc selenide (ZnSe). Both of these materials provide an optical spectral range that is maximized for most applications. The target range for the FTIR sensor system as shown is 5000 cm$^{-1}$ to 400 cm$^{-1}$.

An example of a complete assembly with a single pass gas cell is shown in FIG. 3, which includes the source/gas cell 310, the interferometer bench 381 and the supporting electronics 384. The bench enclosure is sealed by the input window 388 (KBr or ZnSe) and the internal atmosphere is kept dry by the use of desiccant 382. In this type of assembly, the desiccant 382 can be replenished by removable holder. Note also that when windows are used in such an arrangement it is typical that the windows are wedged to prevent optical interference, and that the optic is coated. In the case of a KBr window, the optic is coated with a conformal type coating, such as Parylene N; provides moisture protection. In the case of ZnSe moisture protection is not required, but the optic may still be coated with an anti-reflection coating to prevent optical interference from occurring from the window.

The fully functional assembly includes the embedded electronics which provides the internal power conditioning, the interferometer control, the signal acquisition of the detector signal, and the post-processing that is required to convert the spectral signal to a usable output, such as the composition of the gases being measured. In general, the goal is to use low-noise electronics and obtain the highest degree of sensitivity for the measurement. In the case of the signal digitization to use of a delta-sigma Analog-Digital conversion is typically recommended, and this may be combined with techniques such as over-sampling to improve the measurement quality. Also, part of the signal acquisition is the method of signal encoding by the use of a laser interferometer integrated with the main IR interferometer; a standard procedure used for FTIR signal acquisition.

The use of a solid-state detector completes the functional components of the FTIR device. Example detectors are MCT (mercury-cadmium-telluride) devices, DTGS (deuterated triglycine sulfate) devices or bolometers, and lithium tantallate pyroelectric devices. For low cost instrumentation, the use of lithium tantallate is the most common, with the material providing good sensitivity, good thermal tolerance and low cost. In one example, a detector has a detector size of 2 mm×2 mm and a beam splitter has a throw of +/−5 to 6 mm.

Materials of construction are important because the components are used for real-time process monitoring of gases and vapors. Typical fabrication materials are aluminum, stainless steel, certain plastics and glass. For some gases it might be necessary to use a protective coating to prevent corrosion, examples being the use of nickel or nichrome for the protection of aluminum surfaces. For some structures it can be beneficial to use molded structures, including die-cast aluminum parts for strength and ease of assembly.

In one example of a semiconductor process application, the optical spectral sensing system performs analysis of exhaust gases from an abatement system in a fabrication facility. The optical spectral sensing system detects and measures byproducts and breakdown products of semiconductor process gases and green house gases (e.g., $NH_3$, HCl, $SiH_4$, R32, $NF_3$, CO, HCN, $SO_2$, F116, $SF_6$, $CF_4$, HF, $SO_2F_2$, F218, $CHF_3$, DCS, $CH_4$, $NO_2$, F318, $COF_2$, Ethane, NO, $COF_2$, $C_4F_6$, HBr, $N_2O$, $CF_4$, $CH_3F$) in order to reduce green house gas (GHG) emissions. The optical spectral sensing system is small, low cost, simple to use, and operates with a high spectral background from $CO_2$ and water vapor.

An optical spectral sensing system that provides a full-range mid-IR FTIR based measurement for gases, vapors, and fluids is disclosed. The system features a small interferometer module which is integrated with a sample cell and solid-state source, that has an optimized optical path matched to the intended concentration ranges for the gas/vapor measurements. The concentration ranges targeted are from % level, as provided by short-pathlength gas cells, to parts-per-million (ppm) and for certain gases high parts-per-billion (ppb), provided by long-pathlength gas cells. The optics and opto-mechanical components selected are able to provide a spectral range of 400 $cm^{-1}$ to 5000 $cm^{-1}$, with nominal spectral resolutions of 4 $cm^{-1}$ to 16 $cm^{-1}$, with the potential to extend the resolution from 2 $cm^{-1}$ out to 32 $cm^{-1}$. The electronics are optimized to support both the range and spectral resolution based on the use of a "universal" mid-IR detector, such as a high-performance lithium tantallate pyro-electric device. Anticipated peak-to-peak signal-to-noise (SNR) performance is 1000:1 or greater for a spectrum acquisition time of 30 seconds or less, based on the industry standard method of measurement. The integrated system, FTIR plus gas cell is controlled by onboard electronics, which includes spectrum acquisition, spectrum digitization (solid-state laser/VCSEL enabled), and one or more microprocessors that manage system communications and the computation of gas component concentrations.

Figure 12:
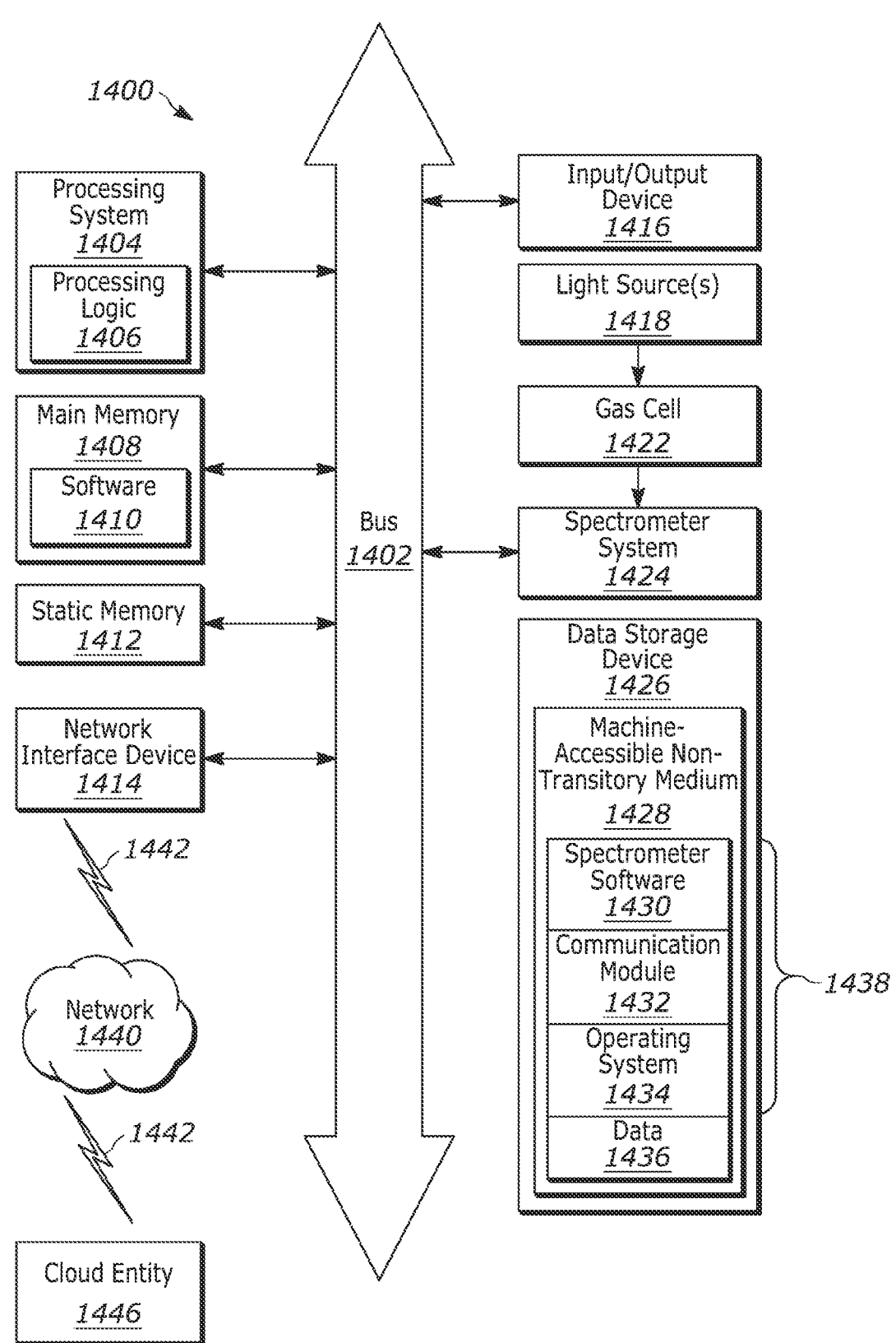
FIG. 12 is an example diagrammatic representation of a machine in the form of a computer system or device within which a set of instructions, for causing the machine to perform any one or more of the methodologies discussed herein, may be executed.

FIG. 12 is an example diagrammatic representation of a machine in the form of a computer system or device within which a set of instructions, for causing the machine to perform any one or more of the methodologies discussed herein, may be executed. In alternative embodiments, the machine may be connected (e.g., networked) to other machines in a LAN, an intranet, an extranet, or the Internet.

The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a mobile device, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary device 1400 (e.g., optical spectral sensing system) includes processing system 1404, main memory 1408 (e.g., read-only memory (ROM), flash memory, dynamic random access memory (DRAM) such as synchronous DRAM (SDRAM) or Rambus DRAM (RDRAM), etc.), static memory 1412 (e.g., flash memory, static random access memory (SRAM), etc.), and data storage device 1426, which communicate with each other via bus 1402.

The optical spectral sensing system 1400 is configured to execute instructions to perform algorithms and analysis to determine at least one of specific gases, vapors, or fluids detected.

The optical spectral sensing system 1400 is configured to collect data and to transmit the data directly to a remote location such as cloud entity 1446 that is connected to network 1440. Network interface device 1414 transmits the data to network 1440 over network connection 1442. The data collected by device 1400 can be stored in data storage device 1426 and also in a remote location such as cloud entity 1446 (which can be connected to network 1440 via network connection 1444) for retrieval or further processing.

Processing system 1404 represents one or more general-purpose processing devices such as a microprocessor, central processing unit, or the like. More particularly, processing system 1404 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing system 1404 may also be one or more special-purpose processing devices such as an application specific integrated circuit (ASIC), a field programmable gate array (FPGA), a digital signal processor (DSP), network processor, or the like. Processing system 1404 is configured to execute processing logic 1406 for performing the operations and steps discussed herein. Processing system 1404 may include a signal processor, AI module, digitizer, int., and synch detector.

Excitation energy from one or more excitation (i.e., light source(s) 1418) source(s) is directed through a gas cell 1422 at target gases in order to generate an emission. Although light source(s) 1418 are shown, the disclosed embodiments may include any number of excitation sources, including using only a single light source. Preferably, light source or sources may produce narrow-band energy of about 10 nanometers or less. More preferably, the narrow-band energy is about 3 nanometers or less. Light sources may be turned on and off quickly, such as in a range of about or less than 0.01 of a second. Preferably, light sources may be turned on and off within a time period of about 0.001 second.

Emission energy from the targeted gas or liquid can be detected through an optic/low-pass spectral filter prior to being analyzed by spectrometer system.

Spectrometer system 1424 [or array of detectors] can be coupled to a synchronous detector of processing system 1404. A miniature spectrometer design platform (e.g., miniature optical sensor system) utilizes a FTIR spectrometer in one example.

Device 1400 may further include network interface device 1414. Device 1400 also may include input/output device 1416 or display (e.g., a liquid crystal display (LCD), a plasma display, a cathode ray tube (CRT), or touch screen for receiving user input and displaying output.

Data storage device 1426 may include machine-accessible non-transitory medium 1428 on which is stored one or more sets of instructions (e.g., software 1438) embodying any one or more of the methodologies or functions described herein. The software 1438 may include operating system 1434, spectrometer software 1430 (e.g., multispectral detection software), and communication module 1432. Software 1438 may also reside, completely or at least partially, within main memory 1408 (e.g., software 1410) and/or within processing system 1404 during execution thereof by device 1400, main memory 1408 and processing system 1404 also constituting machine-accessible storage media. Software 1438 and/or 1410 may further be transmitted or received over network 1440 via network interface device 1414.

Machine-accessible non-transitory medium 1428 may also be used to store data 1436 for measurements and analysis of the data for the detection system. Data may also be stored in other sections of device 1400, such as static memory 1412, or in cloud entity 1446.

In the description above, for the purposes of explanation, numerous specific details are set forth in order to provide a thorough understanding of the described examples. It will be apparent, however, to one skilled in the art that examples may be practiced without some of these specific details. In other instances, well-known structures and devices are shown in block diagram form. There may be intermediate structures between illustrated components. The components described or illustrated herein may have additional inputs or outputs that are not illustrated or described.

Various examples may include various processes. These processes may be performed by hardware components or may be embodied in computer program or machine-executable instructions, which may be used to cause processor or logic circuits programmed with the instructions to perform the processes. Alternatively, the processes may be performed by a combination of hardware and software.

Portions of various examples may be provided as a computer program product, which may include a non-transitory computer-readable medium having stored thereon computer program instructions, which may be used to program a computer (or other electronic devices) for execution by one or more processors to perform a process according to certain examples. The computer-readable medium may include, but is not limited to, magnetic disks, optical disks, read-only memory (ROM), random access memory (RAM), erasable programmable read-only memory (EPROM), electrically erasable programmable read-only memory (EEPROM), magnetic or optical cards, flash memory, or other type of computer-readable medium suitable for storing electronic instructions.

Moreover, examples may also be downloaded as a computer program product, wherein the program may be transferred from a remote computer to a requesting computer. In some examples, non-transitory computer readable storage media (e.g., machine-accessible non-transitory medium 1428) have stored thereon data representing sequences of instructions that, when executed by one or more processors (e.g., processing system 1404), cause the one or more processors to perform certain operations.

Figure 13:
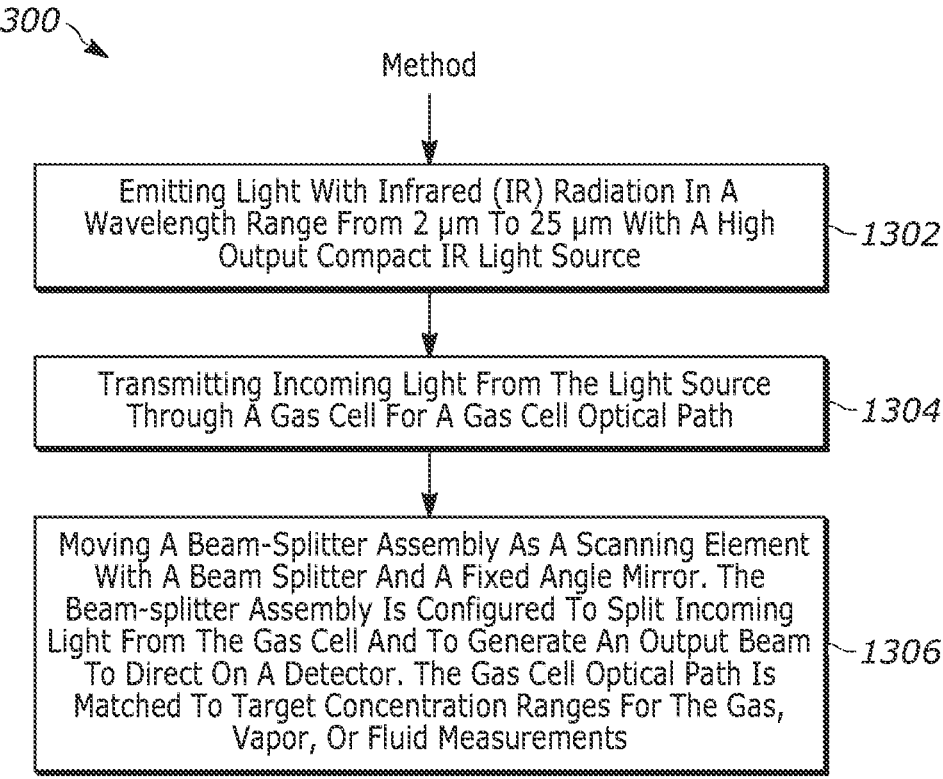
FIG. 13 illustrates a method of processing a sample and performing spectroscopy of the sample with a spectrometer system in accordance with one embodiment.

In one embodiment, a method to sense and analyze gases, vapors, or fluids with a mid-infrared (FT-IR) spectrometer sensor system is illustrated in FIG. 13 in accordance with one embodiment. FIG. 13 illustrates a method 1300 that may be executed by a miniature spectrometer sensor system in accordance with one embodiment. In an example, the miniature spectrometer sensor system has width, length, and depth dimensions in millimeters (e.g., width of approximately 40 to 44 mm, a height of 30 to 34 mm, and a length of 94 to 98 mm).

At operation 1302, the method includes emitting light with infrared (IR) radiation in a wavelength range from 2 μm to 25 μm with a high output compact IR light source. At operation 1304, the method includes transmitting incoming light from the light source through a gas cell for a gas cell optical path.

At operation 1306, the method includes moving a beam-splitter assembly as a scanning element with a beam splitter and a fixed angle mirror. The beam-splitter assembly is configured to split incoming light from the gas cell and to generate an output beam to direct on a detector. The gas cell optical path is matched to target concentration ranges for the gas, vapor, or fluid measurements.

In one example, the gas cell includes semiconductor processing gases to be sensed and analyzed. The gas cell can be a 50 mm pathlength gas cell to target monitoring of high component concentrations without absorption interference from background water vapor and carbon dioxide.

Alternatively, the gas cell can be an extended pathlength gas cell to target monitoring of low component concentrations in parts per million or parts per billion without absorption interference from background water vapor and carbon dioxide.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Reference in the specification to "an example," "one example," "some examples," or "other examples" means that a particular feature, structure, or characteristic described in connection with the examples is included in at least some examples, but not necessarily all examples. Additionally, such feature, structure, or characteristics described in connection with "an example," "one example," "some examples," or "other examples" should not be construed to be limited or restricted to those example(s), but may be, for example, combined with other examples. The various appearances of "an example," "one example," or "some examples" are not necessarily all referring to the same examples.

What is claimed is:

1. A Mid-infrared fourier transform (FT-IR) sensor system to sense and analyze flowing gas, vapor, or fluid streams in a spectral range comprising:

a compact infrared (IR) light source wherein the light source is configured in operation to emit electromagnetic radiation in the spectral range from 2 μm to 25 μm and to provide energy for a spectral process;

a gas cell to interface to the light source, the gas cell to receive incoming light from the light source; and a moving beam-splitter assembly as a scanning element with a beam splitter and a fixed angle mirror, the scanning beam splitter is configured to split incoming light from the gas cell and to generate an output beam to direct on a detector.

2. The Mid-infrared FT-IR sensor system of claim 1, wherein the gas cell includes semiconductor processing gases to be sensed and analyzed.

3. The Mid-infrared FT-IR sensor system of claim 1, wherein the gas cell includes airborne pollutants to be sensed and analyzed for general environmental monitoring of the airborne pollutants.

4. The Mid-infrared FT-IR sensor system of claim 1, further comprising:

a plate to mount the beam splitter and the fixed angle mirror to move together in operation.

5. The Mid-infrared FT-IR sensor system of claim 1, wherein the light source is a compact emitter.

6. The Mid-infrared FT-IR sensor system of claim 1, wherein the gas cell is disposable.

7. The Mid-infrared FT-IR sensor system of claim 1, further comprising:

an electronic detector and control module that comprises an electronics circuit board and computer system for sensing and analysis of gases to identify and quantify.

8. The Mid-infrared FT-IR sensor system of claim 1, wherein the light source comprises a Micro-Electro-Mechanical System (MEMS) light source that is configured in operation to be pulsed.

9. The Mid-infrared FT-IR sensor system of claim 1, wherein the gas cell comprises a circular geometry to receive an IR beam from the compact infrared (IR) light source with the IR beam entering a cylindrical construction with opposing mirrors and the IR beam exits the cylindrical construction after multiple reimaging throughout a cell cavity of the gas cell to provide an extended optical pathlength of 5 meters.

10. The Mid-infrared FT-IR sensor system of claim 1, wherein the gas cell comprises a 50 mm pathlength gas cell that has a width of approximately 40 to 44 mm, a height of 30 to 34 mm, and a length of 94 to 98 mm.

11. A method to sense and analyze gases, vapors, or fluids with a mid-infrared spectrometer system comprising:

emitting light with infrared (IR) radiation in a wavelength range from 2 μm to 25 μm with a compact IR light source;

transmitting incoming light from the light source through a gas cell for a gas cell optical path; and moving a beam-splitter assembly as a scanning element with a beam splitter and a fixed angle mirror, the beam-splitter assembly is configured to split incoming light from the gas cell and to generate an output beam to direct on a detector, wherein the gas cell optical path is matched to target concentration ranges for gas, vapor, or fluid measurements.

12. The method of claim 11, wherein the gas cell includes semiconductor processing gases to be sensed and analyzed.

13. The method of claim 11, wherein the gas cell comprises a 50 mm pathlength gas cell to target monitoring of high component concentrations without absorption interference from background water vapor and carbon dioxide.

14. The method of claim 11, wherein the gas cell comprises an extended pathlength gas cell to target monitoring of low component concentrations in parts per million or parts per billion without absorption interference from background water vapor and carbon dioxide.

15. A miniature optical sensor system to sense and analyze flowing gas, vapor, or fluid streams in a spectral range comprising:

a compact infrared (IR) light source wherein the light source is configured in operation to emit electromagnetic radiation in the spectral range from 2 μm to 25 μm and to provide energy for a spectral process;

a gas cell to receive incoming light from the light source; and a moving beam-splitter assembly as a scanning element with a beam splitter and a mirror, the scanning beam splitter is configured to split incoming light from the gas cell and to generate an output beam to direct on a detector.

16. The miniature optical sensor system of claim 15, wherein the gas cell includes semiconductor processing gases to be sensed and analyzed.

17. The miniature optical sensor system of claim 15, further comprising:

a plate to mount the beam splitter and the mirror to move together in operation.

18. The miniature optical sensor system of claim 15, further comprising:

an electronic detector and control module that comprises an electronics circuit board and computer system for sensing and analysis of gases to identify and quantify.

19. The miniature optical sensor system of claim 15, wherein the gas cell comprises a circular geometry to receive an IR beam from the compact infrared (IR) light source with the IR beam entering a cylindrical construction with opposing mirrors and the IR beam exits the cylindrical construction after multiple reimaging throughout a cell cavity of the gas cell to provide an extended optical pathlength of 5 meters.

20. The miniature optical sensor system of claim 15, wherein the gas cell comprises a 50 mm pathlength gas cell that has a width of approximately 40 to 44 mm, a height of 30 to 34 mm, and a length of 94 to 98 mm.

* * * * *